(12) United States Patent
Luo et al.

(10) Patent No.: US 8,570,777 B2
(45) Date of Patent: Oct. 29, 2013

(54) POWER SUPPLY CIRCUIT WITH SPIKE SUPPRESSION CIRCUIT

(75) Inventors: Qi-Yan Luo, Shenzhen (CN); Song-Lin Tong, Shenzhen (CN); Peng Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 313 days.

(21) Appl. No.: 13/207,342

(22) Filed: Aug. 10, 2011

(65) Prior Publication Data

US 2012/0326682 A1  Dec. 27, 2012

(30) Foreign Application Priority Data

Jun. 24, 2011 (CN) .......................... 2011 1 0172805

(51) Int. Cl.
*H02M 1/12* (2006.01)
*H02M 1/14* (2006.01)

(52) U.S. Cl.
USPC .................. 363/44; 363/45; 363/46; 363/52; 363/53; 363/84; 363/86; 363/125; 363/127

(58) Field of Classification Search
USPC ........ 363/44, 45, 46, 52, 53, 84, 86, 125, 127
See application file for complete search history.

(56) References Cited

U.S. PATENT DOCUMENTS

| 7,433,213 B2 * | 10/2008 | Casteel et al. .................. 363/44 |
| 7,502,238 B2 * | 3/2009 | Wei et al. ........................ 363/44 |
| 2012/0134185 A1 * | 5/2012 | Shin et al. ....................... 363/44 |

* cited by examiner

*Primary Examiner* — Bao Q Vu
(74) *Attorney, Agent, or Firm* — Altis & Wispro Law Group, Inc.

(57) ABSTRACT

A power supply circuit includes a pulse width modulation (PWM) chip, a number of phase circuits, a voltage output end, and a spike suppression circuit. The spike suppression circuit is connected to each of the phase circuits and the voltage output end. The PWM chip controls all of the phase circuits to alternately output power supply voltages according to a predetermined sequence. The spike suppression circuit receives the power supply voltages, and filters out voltage spikes in the power supply voltages, thereby outputting steady voltages to the voltage output end.

7 Claims, 2 Drawing Sheets

POWER SUPPLY CIRCUIT WITH SPIKE SUPPRESSION CIRCUIT

BACKGROUND

1. Technical Field

The disclosure generally relates to power supplies, particular to a power supply circuit that includes a spike suppression circuit.

2. Description of Related Art

Many electronic devices use multi-phase power supplies. However, in using the multi-phase power supplies, one or more phases of the multi-phase power supplies may generate corresponding voltage spikes, which will lead to an imbalance of output voltages. Even more, if a voltage spike generated by a multi-phase power supply is higher than a rated voltage, the multi-phase power supply may be damaged. Therefore, there is room for improvement within the art.

BRIEF DESCRIPTION OF THE DRAWINGS

Many aspects of the present embodiment can be better understood with reference to the following drawings. The components in the drawings are not necessarily drawn to scale, the emphasis instead being placed upon clearly illustrating the principles of the present embodiment.

DETAILED DESCRIPTION

Figure 1:
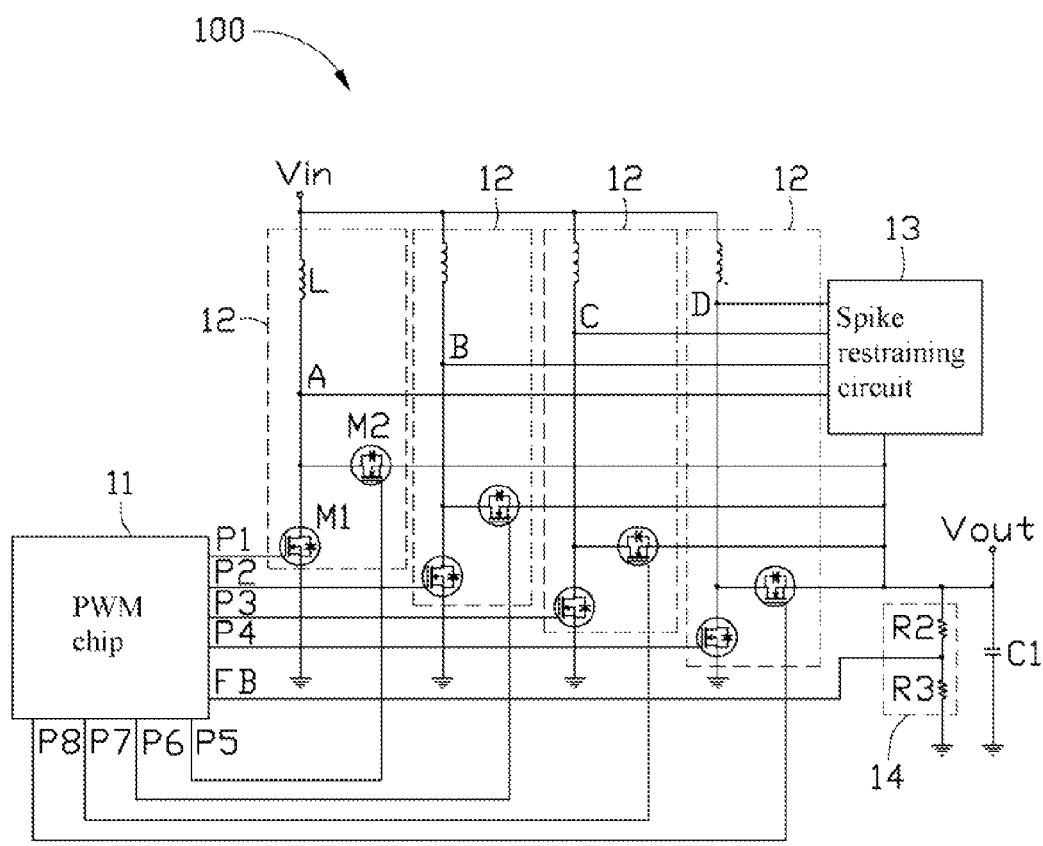
FIG. 1 is a circuit diagram of a power supply circuit, according to an exemplary embodiment.

FIG. 1 is a circuit diagram of a power supply circuit 100, according to an exemplary embodiment. The power supply circuit 100 includes a voltage input end Vin, a pulse width modulation (PWM) chip 11, a plurality of phase circuits 12, a spike suppression circuit 13, and an output end Vout. In the present embodiment, the power supply circuit 100 includes four phase circuits 12. The PWM chip 11 can generate pulse signals to control the phase circuits 12 to alternately output voltages to electronic devices (not shown), thereby supplying power to the electronic devices. The spike suppression circuit 13 can suppress voltage spikes generated by the phase circuits 12, and protect the power supply circuit 100.

The PWM chip 11 includes a plurality of first control pins corresponding to the phase circuits 12 (e.g., in the present embodiment, there are four first control pins P1, P2, P3, P4), a plurality of second control pins corresponding to the phase circuits 12 (e.g., four second control pins P5, P6, P7, P8), and a feedback pin FB.

Each of the phase circuits 12 includes a first metal-oxide-semiconductor field-effect transistor (MOSFET) M1, a second MOSFET M2, and an inductor L. In each of the phase circuits 12, a gate of the first MOSFET M1 is connected to a corresponding first control pin, for example, the first control pin P1. A source of the first MOSFET M1 is grounded. A drain of the first MOSFET M1 is connected to both an end of the inductor L and a drain of the second MOSFET M2. The other end of the inductor L is connected to the voltage input end Vin. A gate of the second MOSFET M2 is connected to a corresponding second control pin, for example, the second control pin P5. Sources of all the second MOSFETs M2 of all of the phase circuits 12 share the voltage output end Vout, which is grounded by a first capacitor C1. Furthermore, the drains of the second MOSFETs M2 of all of the phase circuit 12 are also used as output nodes A, B, C, and D.

Figure 2:
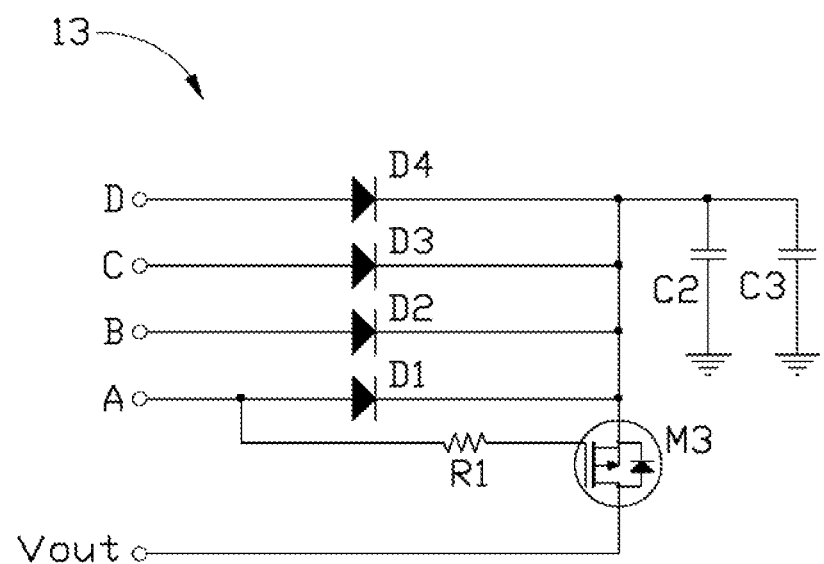
FIG. 2 is a circuit diagram of one embodiment of a spike suppression circuit of the power supply circuit shown in FIG. 1.

Also referring to FIG. 2, the spike suppression circuit 13 includes a plurality of diodes D1, D2, D3, D4 corresponding to the phase circuits 12, a first resistor R1, a third MOSFET M3, a second capacitor C2, and a third capacitor C3. Anodes of the diodes D1, D2, D3, D4 are respectively connected to the corresponding output node (e.g., the anode of the diode D1 is connected to the output node A). Cathodes of the diodes D1, D2, D3, D4 are all connected to a source of the third MOSFET M3. The source of the third MOSFET M3 is also connected between one end of the second capacitor C2 and one end of the third capacitor C3. The other end of the second capacitor C2 and the other end of the third capacitor C3 are both grounded. A gate of the third MOSFET M3 is connected to one of the output nodes A, B, C or D (e.g., the end of the first resistor R1 is connected to the output node A). A drain of the MOSFET M3 is connected to the voltage output end Vout.

In use, the PWM chip 11 generates and transmits control signals to the phase circuits 12 through the corresponding first control pins and the second control pins. In each of the phase circuits 12, upon receiving the control signals, the first MOSFET M1 is turned off and the second MOSFET M2 is turned on. Thus, an original voltage of a power supply (not shown) is received through the voltage input end Vin, and transmitted to the drain of the second MOSFET M2, and is further transmitted to the voltage output end Vout. The inductor L and the first capacitor C1 filter the original voltage from alternating current (AC) to a desired direct current (DC) voltage when it is transmitted to the voltage output end Vout. In particular, the PWM chip 11 alternately transmits control signals to all of the phase circuits 12 according to a predetermined sequence. Thus, the first MOSFET M1 and the second MOSFET M2 are alternately turned on and off according to the predetermined sequence, and the DC voltages generated by all of the phase circuits 12 are alternately transmitted to the voltage output end Vout according to the predetermined sequence (e.g., the DC voltages generated by the output node A, B, C, D are respectively transmitted to the voltage output end Vout in that order), and used as power supply voltages for electronic devices (not shown) using the power supply circuit 100. In this way, the power supply circuit 100 acts as a multi-phase power supply.

Since the drains of the second MOSFETs M2 are used as output nodes, when the original voltage is alternately transmitted to the drains of the second MOSFETs M2, the original voltage is also alternately transmitted to the spike suppression circuit 13 through the output nodes. In the present embodiment, when the original voltage is transmitted to the spike suppression circuit 13 through the output node A, the third MOSFET M3 is turned off, and the original voltage is transmitted to ground through the first capacitor C1. In this way, the capacitor C1 is charged, and obtains a voltage V1.

When the original voltage is transmitted to the spike suppression circuit 13 through any of the output nodes B, C, and D, the original voltage is transmitted to the source of the third MOSFET M3 to turn on the third MOSFET M3. Thus, the first capacitor C1 discharges to ground through the second capacitor C2 and the third capacitor C3, such that the second capacitor C2 and the third capacitor C3 both obtain a voltage V2. Since the second capacitor C2 and the third capacitor C3 are connected to the corresponding output nodes B, C, D through the diode D2, D3, D4, a voltage V3 of the output nodes B, C, D will meet the following formula: $V3=V2+V_D$ ($V_D$ represents a voltage of the diode D2, D3, or D4).

Furthermore, when the original voltage is transmitted to the spike suppression circuit 13 through the output node A again, the third MOSFET M3 is turned off again. Thus, the original voltage is transmitted to ground through the second capacitor C2 and the third capacitor C3. Thus, the second capacitor C2 and the third capacitor C3 are charged, and obtain a voltage V4. Since the second capacitor C2 and the third capacitor C3 are connected to the output node A through the diode D1, so the voltage $V_A$ of the output node A will meet the following formula: $V_A=V4+V_{D1}$ ($V_{D1}$ represents a voltage of the diode D2). In this way, each of the phase circuits 12 will respectively output a steady voltage to the voltage output end Vout, and the power supply circuit 100 is protected from being damaged due to the voltage spikes generated by the phase circuits 12.

In the present embodiment, the power supply circuit 100 further includes a feedback circuit 14. The feedback circuit 14 is connected to the voltage output end Vout and the feedback pin FB. In particular, the feedback circuit 14 includes a second resistor R2 and a third resistor R3. One end of the second resistor R2 is connected to the voltage output end Vout. The other end of the second resistor R2 is connected between the feedback pin FB and one end of the third resistor R3. The other end of the third resistor R3 is grounded. The feedback circuit 14 samples a voltage of the voltage output end Vout, and feedbacks the sampled voltage to the PWM chip 11. The PWM chip 11 receives the sampled voltage, and turns on or off the power supply circuit 100 according to the sampled voltage.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A power supply circuit, comprising:
   a pulse width modulation (PWM) chip;
   a plurality of phase circuits connected to the PWM chip;
   a voltage output end; and
   a spike suppression circuit connected to each of the plurality of the phase circuits and the voltage output end;
   wherein the PWM chip controls all of the phase circuits to alternately output power supply voltages according to a predetermined sequence, the spike suppression circuit receives the power supply voltages, and suppresses voltage spikes in the power supply voltages, thereby outputting steady voltages to the voltage output end.

2. The power supply circuit as claimed in claim 1, wherein each of the phase circuit includes a first metal-oxide-semiconductor field-effect transistor (MOSFET), a second MOSFET, and an inductor, a gate of the first MOSFET and a gate of the second MOSFET are both connected to the PWM chip, a source of the first MOSFET is grounded, a drain of the first MOSFET and a drain of the second MOSFET are both connected to a voltage input end via the inductor, a source of the second MOSFET is connected to the voltage output end, the voltage output end is grounded via a first capacitor.

3. The power supply circuit as claimed in claim 2, wherein the PWM chip includes a plurality of first control pins corresponding to the phase circuits, a plurality of second control pins corresponding to the phase circuits, gates of the first MOSFETs of all the phase circuits are respectively connected to their corresponding first control pin, gates of the second MOSFETs of all the phase circuits are respectively connected to their corresponding second control pin.

4. The power supply circuit as claimed in claim 2, wherein the drains of the second MOSFETs are used as output nodes, all of the output nodes are connected to the spike suppression circuit.

5. The power supply circuit as claimed in claim 4, wherein the spike suppression circuit includes a third MOSFET, a plurality of diodes corresponding to the phase circuits, a second capacitor, and a third capacitor, anodes of the diodes are respectively connected to their corresponding the output nodes, cathodes of the diodes are all connected to a source of the third MOSFET, the source of the third MOSFET is connected between one end of the second capacitor and one end of the third capacitor, the other end of the second capacitor and the other end of the third capacitor are both grounded, a gate of the third MOSFET is connected to one of the output nodes by a first resistor, a drain of the third MOSFET is connected to the voltage output end.

6. The power supply circuit as claimed in claim 1, further including a feedback circuit connected to the voltage output end and the PWM chip, wherein the feedback circuit samples a voltage of the voltage output end, and feedbacks the sampled voltage to the PWM chip, the PWM chip receives the sampled voltage, and turns on or off the power supply circuit according to the sampled voltage.

7. The power supply circuit as claimed in claim 6, wherein the PWM chip includes a feedback pin, the feedback circuit includes a second resistor and a third resistor, one end of the second resistor is connected to the voltage output end, the other end of the second resistor is connected between the feedback pin and one end of the third resistor, the other end of the third resistor is grounded.

* * * * *